US010529255B2

(12) United States Patent
Wu et al.

(10) Patent No.: US 10,529,255 B2
(45) Date of Patent: Jan. 7, 2020

(54) SPINAL TRAINING SIMULATOR

(71) Applicants: Tim Wu, Toronto (CA); Fergal Kerins, Toronto (CA)

(72) Inventors: Tim Wu, Toronto (CA); Fergal Kerins, Toronto (CA)

(73) Assignee: Synaptive Medical (Barbados) Inc., Bridgetown (BB)

( * ) Notice: Subject to any disclaimer, the term of this patent is extended or adjusted under 35 U.S.C. 154(b) by 0 days.

(21) Appl. No.: 15/611,982

(22) Filed: Jun. 2, 2017

(65) Prior Publication Data
US 2018/0350268 A1    Dec. 6, 2018

(51) Int. Cl.
| G09B 23/28 | (2006.01) |
| G09B 23/32 | (2006.01) |
| G09B 9/00 | (2006.01) |
| G09B 23/34 | (2006.01) |
| B29C 39/12 | (2006.01) |
| B29C 39/38 | (2006.01) |
| B29K 29/00 | (2006.01) |
| B29L 31/00 | (2006.01) |

(52) U.S. Cl.
CPC ............ *G09B 23/32* (2013.01); *B29C 39/123* (2013.01); *B29C 39/38* (2013.01); *G09B 9/00* (2013.01); *G09B 23/286* (2013.01); *G09B 23/34* (2013.01); *B29K 2029/04* (2013.01); *B29L 2031/7532* (2013.01)

(58) Field of Classification Search
USPC ................................. 434/262, 267, 272, 274
See application file for complete search history.

(56) References Cited

U.S. PATENT DOCUMENTS

| 979,147 | A | * | 12/1910 | Fryette | .................... | G09B 23/32 |
| | | | | | | 434/274 |
| 2,108,229 | A | * | 2/1938 | Metz | ...................... | G09B 23/32 |
| | | | | | | 434/274 |
| 4,200,995 | A | * | 5/1980 | Trella | ..................... | G09B 23/34 |
| | | | | | | 434/274 |
| 4,872,841 | A | * | 10/1989 | Hamilton | ............... | G09B 23/30 |
| | | | | | | 434/274 |
| 5,672,059 | A | * | 9/1997 | Browne-Wilkinson | ...................... |
| | | | | | | G09B 23/34 |
| | | | | | | 434/274 |
| 6,422,874 | B1 | * | 7/2002 | Green | .................... | G09B 23/32 |
| | | | | | | 434/256 |

(Continued)

OTHER PUBLICATIONS

"4D Master", online: Fame Master <http://www.famemaster.com/product_detail-pid-38-id-116>, accessed: May 31, 2017.

(Continued)

*Primary Examiner* — Kurt Fernstrom
(74) *Attorney, Agent, or Firm* — Rowand LLP

(57) ABSTRACT

A spinal training simulator kit with an operable module unit for surgical training is described. The spinal training simulator kit includes an anatomical base model of at least a portion of a spinal column and at least one high-fidelity module unit, the module unit comprising intervertebral disc analogues and vertebral segment analogues, and the module unit configured to fit within the base model in an anatomically correct orientation and location. The module unit may be acted upon, i.e. surgical instruments may be passed through, thus, providing a realistic simulator for surgical training.

22 Claims, 4 Drawing Sheets

(56) References Cited

U.S. PATENT DOCUMENTS

| | | | |
|---|---|---|---|
| 8,113,847 B2 | 2/2012 | Boachie-Adjei | |
| 2008/0009945 A1* | 1/2008 | Pacheco | A61F 2/4657 623/17.16 |
| 2008/0138781 A1 | 6/2008 | Pellegrin et al. | |
| 2010/0099066 A1 | 4/2010 | Mire et al. | |
| 2013/0252220 A1* | 9/2013 | Wang | G09B 23/32 434/274 |
| 2015/0170548 A1* | 6/2015 | McClintock | G09B 23/32 434/275 |
| 2015/0339954 A1* | 11/2015 | East | G09B 23/285 434/274 |
| 2016/0012753 A1 | 1/2016 | Mehdian et al. | |
| 2016/0189571 A1* | 6/2016 | Wang | G09B 23/32 434/274 |

OTHER PUBLICATIONS

"Torse for Epidural/CSF Access and Percutaneous Lead Placement", online: Sawbones <https://live.sawbones.com/products/surgical-models/injection/torso-w-spine-t6-sacrum-and-replaceable-soft-tissue-cover-for-lead-placement.html>, accessed: May 31, 2017.

"Human Spine Models", online: Dynamic Disc Designs <https://dynamicdiscdesigns.com/>, accessed May 31, 2017.

"Astris 1.0", online: Biotras <http://www.biotras.com/#biotras>, accessed May 31, 2017.

"Surgical Simulation Training System", online: RealSpine <http://www.realspine.de/technology.html>, accessed May 31, 2017.

"TraumaVision", online: Swemac <http://www.swemac.com/simulators/traumavision>, accessed May 31, 2017.

\* cited by examiner

SPINAL TRAINING SIMULATOR

FIELD

The present disclosure generally relates to tissue simulators, and, in particular to tissue simulators for surgical training.

BACKGROUND

Surgical training simulators are a useful tool for providing a practice forum for surgeons or other such health professionals who require a controlled practice environment to practice surgical procedures. Surgeons undergo a great deal of education and training to prepare for surgeries, however, the ability to practice the procedures first-hand is often limited to cadaver opportunities or animal procedures. Obtaining cadavers may be expensive, and some countries may not permit the use of cadavers for religious and/or cultural reasons. Animal models may be more accessible; however, the animal anatomy differs significantly when compared to the human anatomy, including pathologies and injuries that manifest in animals, and the size and shape of specific organs. Additionally, the cost and resources to locate an operating theatre to perform the training may be a further hindrance. Furthermore, it is often difficult to obtain first-hand experience operating on a wide-array of conditions and pathologies which are typically rarely present in specimens used during training. Therefore, simulators that can provide realistic visual and biomechanical properties of actual regions being operated or passed through during a medical procedure provides a useful and cost-effective alternative for surgical training. Such simulators provide a non-cadaveric model that is anatomically accurate, for education and training purposes. The cost of a wholly "operable" spinal model may be prohibitive, therefore, spinal simulator kits that are customizable with respect to "operable" portions, would provide a cost-effective and useful alternative.

BRIEF SUMMARY

The present disclosure describes a spinal training simulator kit, generally, comprising an anatomical base model of at least a portion of a spinal column and at least one high-fidelity module unit, configured to fit within the base model. Thus, the module unit, designed to mimic biomechanical properties of the spinal anatomy, may be "swapped" into the anatomical base model to be acted upon, simulating a realistic surgical experience. The base model remains intact and may be reused, and the module unit, once consumed, may be replaced with another module unit as desired.

In one aspect, the present disclosure describes a spinal training simulator kit, comprising an anatomical base model of at least a portion of a spinal column with a plurality of vertebral segments, a plurality of intervertebral disc segments, and an anatomical module unit comprising at least two vertebral segment analogues and an intervertebral disc analogue. The vertebral segments (including the vertebral segment analogues) are attachable to the intervertebral disc segments by a non-permanent, re-attachable method, with enough mounting force to keep all the components in their correct orientation and location. The anatomical module unit is comprised of two vertebral segment analogues and an intervertebral disc analogue, the intervertebral disc analogue affixed to and sandwiched between the two vertebral segment analogues. The vertebral segment and intervertebral disc analogues are constructed out of materials to mimic the biomechanical properties of the spine and simulate the properties of the anatomical parts. The module unit is operable and may be acted upon per an actual surgical procedure.

In another aspect, the present disclosure describes a method of producing the intervertebral disc analogue composing the module unit. In some embodiments, the method may consist of obtaining a mold of an intervertebral disc, a mold of an annulus fibrosus and a mold of a nucleus pulposus, placing a first solution into the mold of the annulus fibrosus, placing a second solution into the mold of a nucleus pulposus, freezing and thawing the solutions in their respective molds, releasing the solutions from their respective molds, arranging the set annulus fibrosus and nucleus pulposus solutions into the intervertebral disc mold, ensuring the set annulus fibrosus solution is surrounding and contacting the set nucleus pulposus solution, freezing and thawing the solution in the intervertebral disc mold, and releasing the set solution from the mold.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

BRIEF DESCRIPTION OF THE DRAWINGS

Reference will now be made, by way of example, to the accompanying drawings which show example embodiments of the present disclosure.

Similar reference numerals may have been used in different figures to denote similar components.

DESCRIPTION OF EXAMPLE EMBODIMENTS

Figure 1:
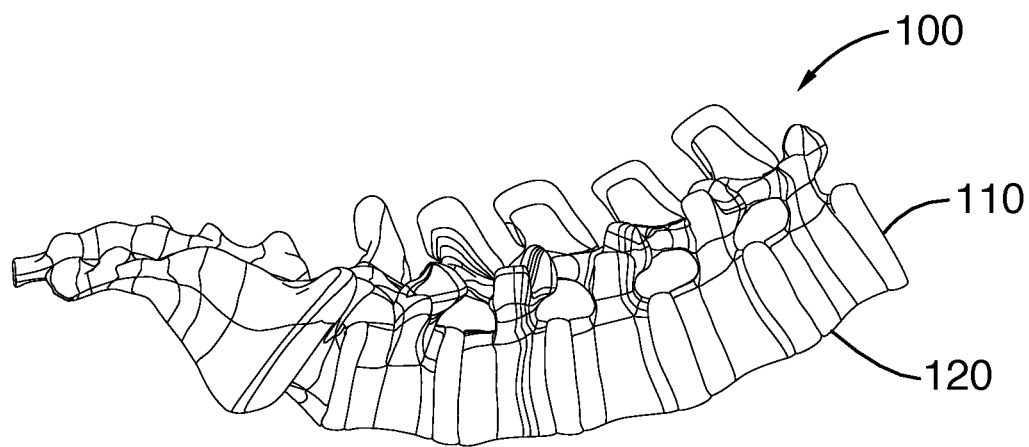
FIG. 1 is a perspective view of a portion of a base model spinal column with the vertebral segments and the intervertebral discs anatomically assembled, in accordance with an embodiment of the present disclosure.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

Unless defined otherwise, all technical and scientific terms used herein are intended to have the same meaning as commonly understood by one of ordinary skill in the art.

Surgical procedures may be complex in nature and medical professionals must often resort to performing a simulated rehearsal of the entire procedure. Unfortunately, the tools and models that are currently available for such simulated rehearsal and training exercises typically fail to provide a sufficiently accurate simulation of the procedure.

Key anatomical components of the spinal column include the vertebral segments, the intervertebral disc and the spinal cord. Vertebrae are boney structures that contribute to the structural stability of the spinal column. Intervertebral discs are soft pads of fibrous cartilage and gel that lie between the vertebrae, acting as a shock absorber to allow the spine to bend and move while minimizing stress on the comparably brittle vertebrae. The spinal cord is a critical component of the spinal column and provides a communication link from the brain to various locations within the body. The spinal cord is extremely delicate and any trauma to the cord is nearly irreversible.

Spinal injuries require complicated procedures often due to the delicate and complex nature of the spinal column and spinal cord. Spinal injuries may be a result of sport injury, aging, or the unfortunate involvement in an accident affecting the spine. The wide range of causes contribute to a correspondingly wide variety of potential spinal injuries that may result. For example, disc herniation where the intervertebral disc may rupture and protrude out of the spinal column may lead to severe back pain or other such uncomfortable sensations as the protrusion impacts the spinal cord. In another example, during a surgical procedure, a dural tear may cause the thin membrane surrounding the spinal cord to tear and for the fluid to leak out. In yet another example, spinal fusion procedures are performed to correct a deformity or the relieve pain and may involve removing the intervertebral disc between two vertebrae and fusing the two disconnected vertebrae together. Fractures or damage within the vertebrae itself are also common.

The present disclosure is directed to a spinal training simulator kit for surgical training. The simulator kit may also be used for demonstration or testing purposes, as well as a model for developing medical functions or devices. A variety of procedures may be simulated by the training model. Thus, the disclosure provides a cost-effective, scalable system to accurately and realistically model vertebrae, intervertebral discs, as well as associated conditions and pathologies without a wholesale redesign or replacement of the training model once consumable pieces have been acted on. It should be noted that while the present disclosure describes examples in the context of a developed, human spine, the present disclosure may also be applicable to other mammalian or animal spines, or any other spinal models that may benefit from the spinal training simulator. Furthermore, the simulator kit may comprise features that enable registration, such as fiducials, touchpoint locations, and spinal contours for optical registration and/or spinal registration. The simulator kit may be imageable with various imaging techniques, such as 3D surface scanning, magnetic resonance imaging (MRI), computerized tomography (CT), optimized coherence tomography (OCT), ultrasound (US), and/or positron emission tomography (PET).

Understanding and modelling tissue and tissue deformation is important for surgeons practicing invasive medical procedures on patients. Being able to accurately model how various types of tissue will deform will enable surgeons to approach targets in the patient's body with minimal damage to collateral tissue. Being able to produce simulators which exhibit biomechanical and imaging characteristics resembling those of patients is a necessary first step in providing a viable life-like simulator on which to practice medical procedures.

Modularity may be a significant advantage in a simulator. Without modular components, the entire simulator is compromised and must be replaced after a procedure has been effected. Introducing modular pieces allows for the simulator to be re-used, and consumed pieces may be replaced. Furthermore, in a modular design, a user may pick and choose their region of interest as well as a variety of conditions, and customize the model as desired. This customization option may be swapped out at will to model various features, conditions and pathologies.

Reference is now made to FIG. 1, which is a perspective view of a portion of a base model spinal column 100 with vertebral segments 120 and intervertebral discs 110 anatomically assembled, in accordance with an embodiment of the present disclosure.

In some embodiments, the base model spinal column 100 may comprise a complete model of the spinal column or a portion of the spinal column. For example, the base model spinal column 100 may comprise the entire length of the spinal column, the cervical portion, thoracic portion, lumbar portion, etc., or a combination thereof. The base model spinal column consists of a plurality of anatomically and geometrically accurate intervertebral discs 110 and vertebral segments 120 at a 1:1 scale. The intervertebral discs 110 are arranged in between vertebral segments 120. In some embodiments, the material of the base model spinal column 100 may be a mechanically relevant and structurally appropriate material, however, not necessarily biomechanically relevant or similar to the authentic vertebrae or intervertebral disc. While the model typically represents a healthy individual with an idealized spine, in some embodiments, various states of spinal deterioration, pathologies and specific structures may be modelled.

In another embodiment, the base model spinal column 100 may model spinal biomechanics to demonstrate various spinal states, such as a diseased state or an outcome of surgery. For example, the model 100 may be manipulated to add and/or remove pressure, or twisted to effect spinal torsion.

Figure 2:
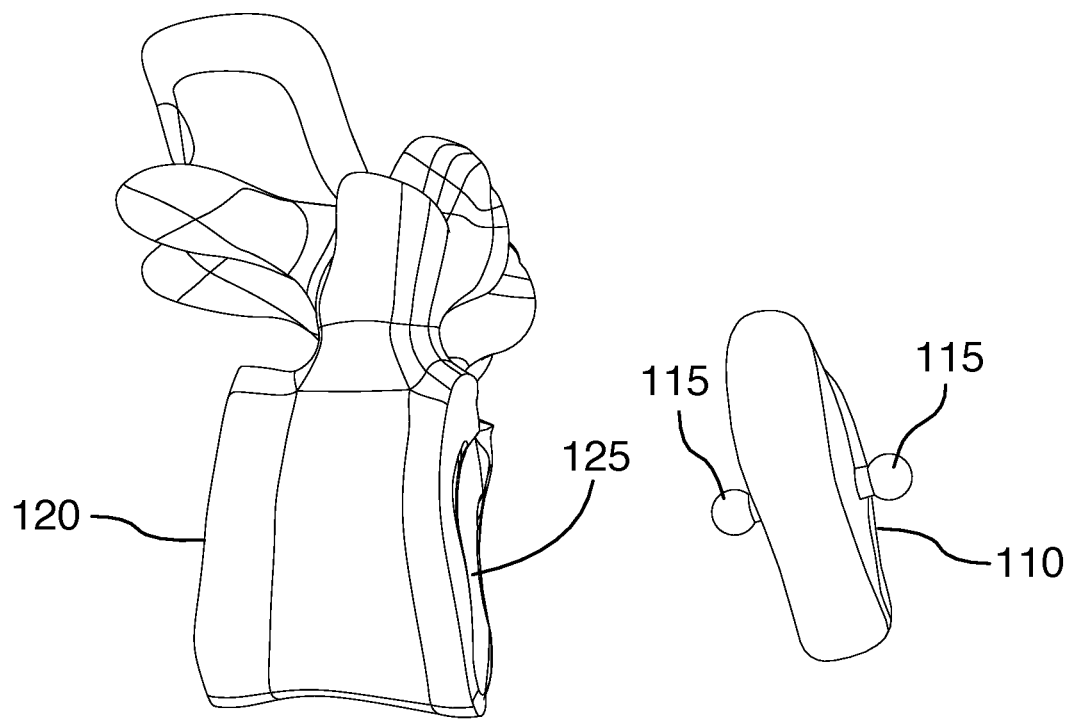
FIG. 2 is a perspective view of a spinal vertebrae and intervertebral disc, in accordance with an embodiment of the present disclosure.

Reference is now made to FIG. 2, which is a perspective view of a vertebral segment 120 and intervertebral disc 110, in accordance with an embodiment of the present disclosure. The vertebral segment 120 and the intervertebral disc 110 are configured to couple together in a non-permanent, non-chemical, re-attachable method, with enough mounting force to keep the component pieces in their correct orientation and location. In some embodiments, the mounting methods may include mechanical (for example, pressure-fitted mechanism) or non-mechanical methods (for example, magnetic mechanism). For example, a mechanical mounting method, such as a ball and socket joint mechanism, wherein each intervertebral disc includes male connectors on opposing sides, designed to fit within corresponding female connections on opposing sides of a vertebral segment. In another example, the mounting mechanism may include magnets, clips, sockets and/or pins.

FIG. 2 illustrates an example embodiment between the vertebral segment 120 and intervertebral disc 110, wherein the vertebral segment includes at least one receiving portion 125 and the intervertebral disc 115 includes a mounting portion 115 disposed on opposing ends of the disc, wherein the receiving portion 125 of the vertebral segment 120 is configured to receive the mounting portion 115 of the intervertebral disc 110.

Figure 3:
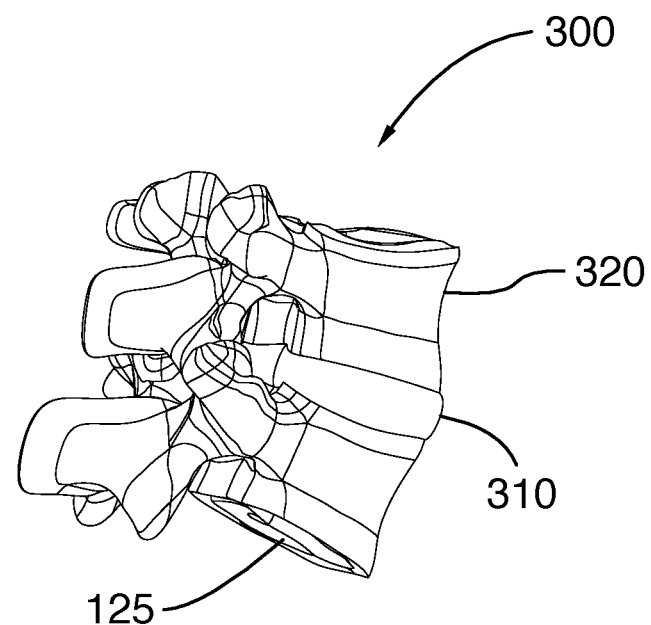
FIG. 3 is side view of a module unit with two vertebral segment analogues connected to the top and bottom surface of the intervertebral disc analogue, in accordance with an embodiment of the present disclosure.

Reference is now made to FIG. 3, which is a side view of a module unit 300 with a vertebral segment analogue 320 connected to the top and a vertebral segment analogue 320 connected to the bottom surface of the intervertebral disc analogue 310, in accordance with an embodiment of the present disclosure. The module unit 300 is operable in that it may be acted upon, for example, with surgical tools as in a surgical procedure and may be disposed once consumed. In some embodiments, the module unit 300 may be modelled to mimic various pathologies, deteriorated states, or any other such conditions, such as but not limited to cancellous or fractured bone.

In another embodiment, the module unit 300 may model spinal biomechanics to demonstrate various spinal states, such as a diseased state or an outcome of surgery. For example, the module unit 300 may be manipulated to add and/or remove pressure, or twisted to effect spinal torsion, wherein the intervertebral disc analogue 310 may compress, expand, bulge or otherwise react accordingly when applied with mechanical force.

As with the vertebral segment 120 in the base model, the vertebral segment analogue 320 (composing the module unit 300) is configured to couple to the base model intervertebral disc 110 in a non-permanent, non-chemical, re-attachable method, with enough mounting force to keep the component pieces in their correct orientation and location.

In some embodiments, the module unit 300 may comprise a visual and biomechanical mimic to simulate a realistic look and feel of spinal vertebrae and intervertebral discs. The vertebral segment analogue 320 may be constructed out of a realistic bone-like material, mimicking the biomechanical properties of actual bone. The design and properties of the vertebral disc analogue allows a user to be trained on surgical procedures such as, but not limited to, drilling, clamping, and mounting hardware into the vertebral segment 320. In some embodiments, the intervertebral disc analogue 310 is constructed out of a hydrogel solution to mimic the mechanical and tactile properties of authentic discs. The vertebral segment analogue 320 may include a receiving portion 125 on the end opposing the end contacting the intervertebral disc analogue 310, wherein the mounting portion 115 from the base model intervertebral disc 110, in anatomically correct order and orientation, may be coupled thereon, and base model vertebral segments 120 onto the base model discs 110 as desired.

In another embodiment, the module unit may include a plurality of intervertebral disc analogues and accordingly, a plurality of vertebral segment analogues to cap each intervertebral disc analogue. The length of the module unit may be of an indeterminate length, so long as it initiates and terminates with a vertebral segment analogue 320. For example, a modular unit may be comprised of two intervertebral disc analogues 310, wherein each intervertebral disc analogue 310 is sandwiched between vertebral segment analogues 320. In some embodiments, the intervertebral disc analogue 310 may be affixed to the vertebral segment analogue 320 and may not include any mounting portions. As mentioned above, in some embodiments, the vertebral segment analogue 320 of the modular unit 300 may be modelled to mimic various pathologies, deteriorated states, or any other such conditions, such as but not limited to cancellous or fractured bone and tears, herniation or infected intervertebral discs.

In some embodiments, the base model spinal column 100 and the modular unit 300 may include cartilage end caps for enhanced realism.

The module unit 300 may visually and biomechanically mimic the vertebral segments and intervertebral discs of a human spinal column. As such, the module unit 300 may be swapped into and out of the base model 100 in its anatomically correct orientation and location, both before and after the module unit 300 has been acted on, and may be used to provide a realistic model for education and training purposes. The modular unit 300 may be acted upon in a typical procedure, or any combination of typical procedures, that engages the vertebral segment or intervertebral disc. Once consumed or "operated on", the module unit 300 may be disposed and replaced.

Figure 4:
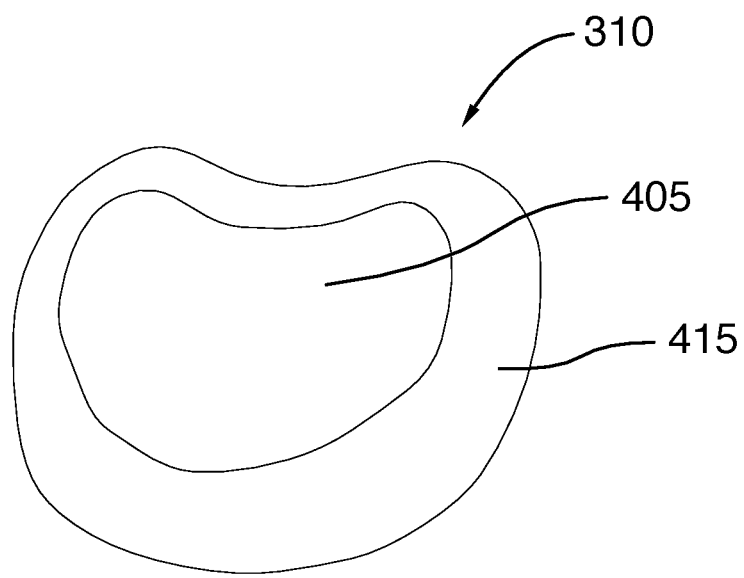
FIG. 4 is a perspective view of the intervertebral disc analogue, in accordance with an embodiment of the present disclosure.

Reference is now made to FIG. 4, which is a perspective view of the intervertebral disc analogue 310, in accordance with an embodiment of the present disclosure. The intervertebral disc analogue 210 comprises an annulus fibrosus mimic 415 and a nucleus pulposus mimic 405, wherein the annulus fibrosus 415 surrounds the nucleus pulposus 405 in a concentric fashion and wherein the annulus fibrosus 415 is fused to the nucleus pulposus 405 to model a complete intervertebral disc.

As described previously, in some embodiments, the intervertebral disc analogue 310 is constructed from a hydrogel solution to mimic the mechanical and tactile properties of authentic intervertebral discs. In some embodiments, the annulus fibrosus 415 will be constructed out of a denser hydrogel than the nucleus pulposus 405, wherein the annulus fibrosus 415 will contain a fibrous matrix to mimic the collagen fibrils in an authentic intervertebral disc. In some embodiments, the nucleus pulposus 405 will be constructed out of a softer hydrogel than the annulus fibrosus 415 to mimic the nucleus pulposus of an authentic intervertebral disc. As mentioned above, in some embodiments, the intervertebral disc analogue 310 of the modular unit 300 may be modelled to mimic various pathologies, deteriorated states, or any other such conditions, such as but not limited to tears, herniation and/or infected states.

In some embodiments, the intervertebral disc analogue 310 of the modular unit 300 may be modelled and thus produced to mimic various pathologies, deteriorated states, or any other such conditions, such as but not limited to tears, herniation and/or infected states.

Figure 5:
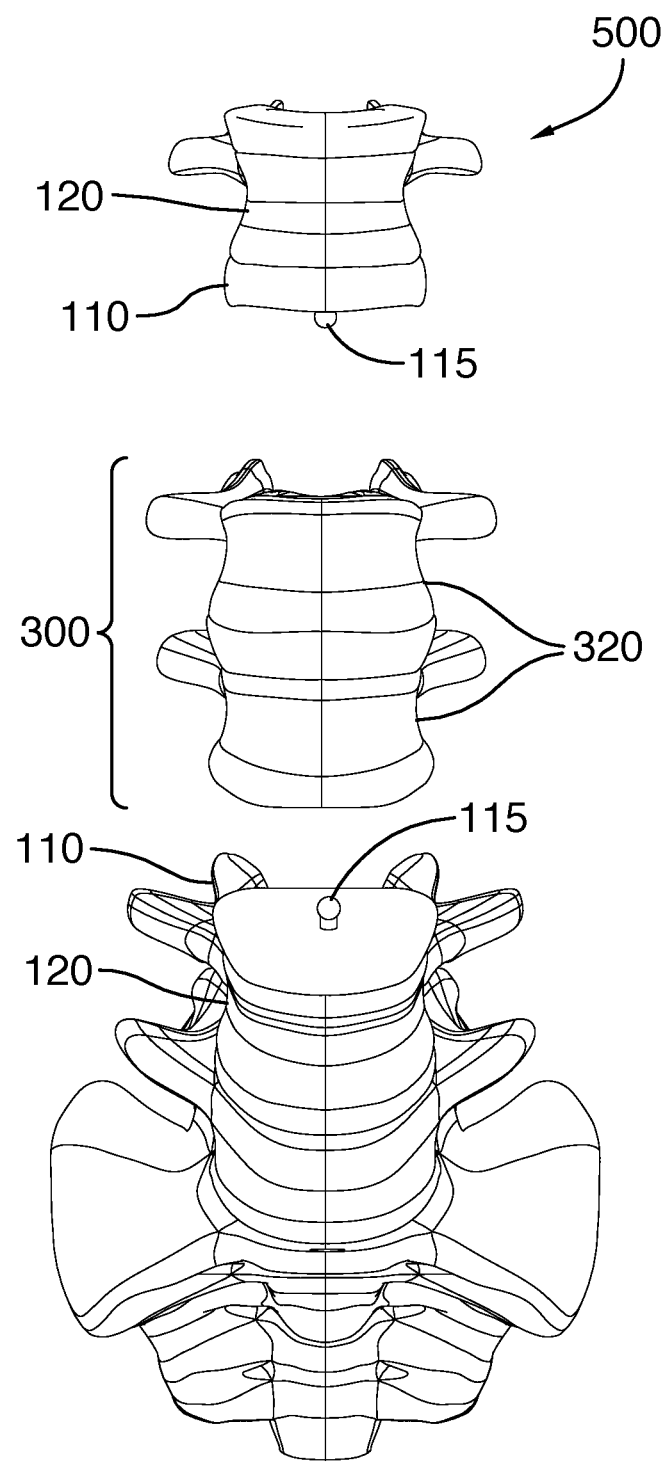
FIG. 5 is an exploded front view showing a portion of the base model spinal column with a module unit placed between base model intervertebral discs, in accordance with an embodiment of the present disclosure.

Reference is now made to FIG. 5, which is an exploded front view showing a portion of the spinal training simulator 500, wherein the module unit 300 is placed between base model intervertebral discs 110, in accordance with an embodiment of the present application. Note the mounting portion 115 on the base model intervertebral disc 110, configured to couple to the receiving portion (not shown) on either a base model vertebral segment (see, for example 120 in FIG. 2) or a vertebral segment analogue 320 on the module unit 300.

The base model spinal column 100 (see, for example FIG. 1) is reusable, while the module unit 300 is typically consumed per use. For example, the vertebral segments 120 and intervertebral discs 110 may be attached and reattached any number of times. A user may obtain a module unit 300 in a desired location (i.e. thoracic, lumbar, etc.) as well as desired state (i.e. healthy, deteriorated, diseased, etc.), remove the corresponding segment(s) in the base model 100, mount the module unit 300 into the base model 100 at the exposed mounting point 115 on the base model intervertebral disc 110 to complete installation of the module unit 300 into the base model spinal column 100 anatomy.

In some embodiments, identifiers, such as text, may be embossed or otherwise printed onto the component pieces of the spinal training simulator 500 to allow for identification of location and orientation when assembling the anatomical model.

The spinal training simulator, comprising the base model spinal column 100 and modular unit 300 may be used in a complementary spine model, such as a torso model, which may include a spinal cord and dura, anterior muscles and skin (not shown) to further enhance realism. In some embodiments, various conditions and pathologies with respect to these complementary spine models, such as within the spinal cord and dura, may also be included in the model. For example, meningiomas or other cancerous pathologies of the bone or the spinal cord and dura may be modelled into the simulator.

Figure 6:
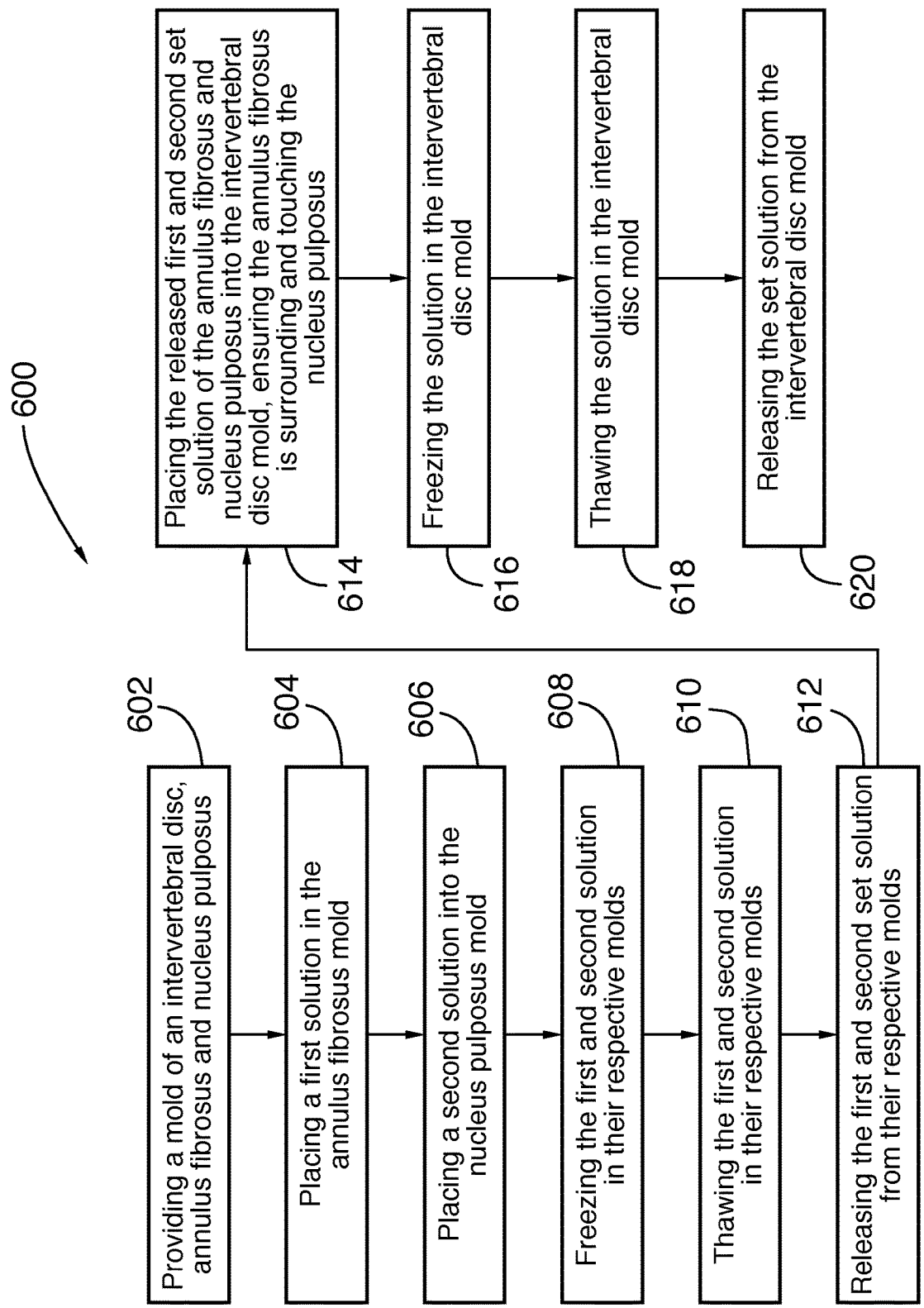
FIG. 6 is a flowchart illustrating an example method for producing an intervertebral disc analogue.

Referring to FIG. 6, the present disclosure also describes a method 600 of producing the intervertebral disc analogue 310 composing the module unit 300. In some embodiments, the method may consist of obtaining a mold of an intervertebral disc, a mold of an annulus fibrosus and a mold of a nucleus pulposus 602, either through self-production or otherwise through other means. In the case the intervertebral disc analogue is used for general training purposes, and not patient specific, the molds may be generic and the size and shape may be obtained from anatomical atlases. If on the other hand they are for patient specific training, the molds may be modelled based from preoperative images taken of a patient, such as, but not limited to, x-ray, PET, MRI, OCT, and/or US.

Continuing with the above embodiment, once the molds of the intervertebral disc, annulus fibrosus and nucleus pulposus have been provided, a first volume of solution may be applied into the annulus fibrosus mold 604. In some embodiments, the solution may be comprised of polyvinyl alcohol (PVA), deionized water and fibrous material. The PVA may be between 7-10% concentration with a molecular weight of 85,000-124,000 g/mol depending on desired outputs. The fibrous material may be cotton or any material desired to mimic the texture and properties of a native annulus fibrosus. The cotton fibers may be added to the PVA solution and combined by high shear at a loading of 0.5% (g/g or wt/wt). In some embodiments, the addition of pigmentation may be integrated into the solution to create a more visually realistic annulus fibrosus mimic.

Continuing with the embodiment above, a second volume of solution may be applied into the nucleus pulposus mold 606. In some embodiments, the solution may be comprised of PVA and deionized water. The PVA may be between 7-10% concentration with a molecular weight of 85,000-124,000 g/mol depending on desired outputs. In some embodiments, the addition of pigments may be integrated into the solution to create a more visually realistic nucleus pulposus mimic.

The first solution (in the mold) may be subjected to one freeze-thaw cycle (FTC) in the mold 608, 610 and released from the mold once the solution has set 612. The second solution (in the mold) may be subjected to one FTC in the mold 608, 610 and released from the mold once the solution has set 612.

Continuing with the embodiment above, once the set annulus fibrosus and nucleus pulposus have been released from their respective molds, the annulus fibrosus and nucleus pulposus hydrogels may be arranged into an intervertebral disc, wherein the annulus fibrosus hydrogel surrounds and is in contact with the nucleus pulposus hydrogel on all sides, in the intervertebral disc mold 614. The intervertebral disc hydrogel comprising the annulus fibrosus and nucleus pulposus hydrogel may be subjected to a FTC 616, 618 to form one seamless fused piece and released from the mold once set 620.

Continuing with the embodiment above, once the intervertebral disc analogue 310 (shown in FIG. 3 or 4, for example) is formed, it may be permanently bonded to the vertebral segment analogue 320 (shown in FIG. 3, for example) using any adhesive or other such appropriate bonding agent.

Except to the extent necessary or inherent in the process themselves, no particular order to steps or stages of methods or processes described in this disclosure is intended or implied. In many cases, the order of process steps may be varied without changing the purpose, effect, or import of the methods described.

Certain adaptations and modifications of the described embodiments can be made. Therefore, the above discussed embodiments are considered to be illustrative and not restrictive.

What is claimed is:

1. A spinal training simulator kit, comprising:
   an anatomical base model of at least a portion of a spinal column, the model comprising:
      a plurality of spinal vertebral segments, each spinal vertebral segment having at least one receiving portion configured to receive a mounting portion; and
      a plurality of intervertebral discs, each intervertebral disc having a first end and an opposing end, each end having a mounting portion configured to couple to the receiving portion of the vertebral segment;
   at least an anatomical module unit, the unit comprising:
      an intervertebral disc analogue, the disc analogue having a first end and an opposing end;
      a first vertebral segment analogue, the vertebrae segment analogue having a first end affixed to the first end of the disc analogue, and the opposing end of the vertebral segment analogue having a receiving portion configured to receive a mounting portion; and
      a second vertebral segment analogue, the vertebral segment analogue having a first end affixed to the opposing end of the disc analogue, and the opposing end of the vertebral segment analogue having a receiving portion configured to receive a mounting portion,
   the anatomical module unit constructed of materials selected on the basis to mimic one or more biomechanical properties of the spine;
   the anatomical module unit being configured to couple to the mounting portion of the intervertebral discs of the anatomical model; and the anatomical module unit being operable to facilitate the training of a surgical procedure;

wherein the intervertebral disc analogue further comprises an annulus fibrosus and a nucleus pulposus wherein the annulus fibrosus surrounds the nucleus pulposus in a concentric fashion and wherein the annulus fibrosus is fused to the nucleus pulposus to model a complete intervertebral disc.

2. The simulator of claim 1 being a scalable system providing anatomically and geometrically accurate vertebral segments and intervertebral discs at a 1:1 ratio.

3. The simulator of claim 1 wherein the vertebral segment, and vertebral segment analogue, is configured to be attached to the intervertebral disc in a non-permanent, re-coupleable, and non-chemical method with sufficient mounting force to orient and position the vertebrae and disc components in an accurate anatomical orientation.

4. The simulator of claim 3 wherein the non-permanent, re-coupleable, and non-chemical method includes mechanical methods.

5. The simulator of claim 1 wherein the vertebral segments and intervertebral discs, and the analogue constituents, model various conditions and pathologies.

6. The simulator of claim 1 wherein mechanical forces is configured to be applied to effect spinal biomechanics.

7. The simulator of claim 1, wherein the anatomical model is constructed out of materials sufficient for the structural support of the spinal column.

8. The simulator of claim 1, wherein the anatomical model unit comprises a visual and biomechanical mimic to simulate a realistic look and "feel" of spinal vertebrae and intervertebral disc.

9. The simulator of claim 1, wherein the anatomical model unit is operable and disposable following the performance of a surgical procedure.

10. The simulator of claim 1, wherein the intervertebral disc analogue is constructed of materials to mimic the visual and biomechanical properties of an authentic intervertebral disc.

11. The simulator of claim 1 wherein the annulus fibrosus of the intervertebral disc analogue is constructed from a hydrogel solution with a fibrous matrix to mimic collagen fibrils in an authentic intervertebral disc.

12. The simulator of claim 1 wherein the nucleus pulposus of the intervertebral disc analogue is constructed from a hydrogel solution to mimic the gel-like mechanical and tactile properties in an authentic intervertebral disc.

13. The simulator of claim 1 wherein the intervertebral disc analogue is configured to model various conditions, selected from a list consisting of tear, herniation, and infection.

14. The simulator of claim 1 wherein the vertebral segment analogue is constructed from a material to simulate the visual and biomechanical properties of bone.

15. The simulator of claim 1 wherein the vertebral segment analogue is configured to model cancellous bone and fractured bone conditions.

16. The simulator of claim 1 wherein the anatomical module unit further comprise a cartilage end cap, the cartilage end cap is configured to be positioned between the intervertebral disc analogue and the vertebral segment analogue.

17. The simulator of claim 1 wherein one or more fiducials are placed to enable image registration and spinal registration.

18. The simulator of claim 1 being imageable with one or more imaging technique.

19. The simulator of claim 1 being operable with complementary anatomical parts, a spinal cord and dura analogue.

20. The simulator of claim 1 being operable with complementary anatomical kits, and spinal torso models.

21. A method of producing an intervertebral disc analogue, the method comprising:
 a) Providing a mold of an intervertebral disc, a mold of an annulus fibrosus and a mold of a nucleus pulposus;
 b) Placing a first solution into the mold of an annulus fibrosus;
 c) Placing a second solution into the mold of a nucleus pulposus;
 d) Freezing the first solution in the annulus fibrosus mold and the second solution in the nucleus pulposus mold;
 e) Thawing the first solution in the annulus fibrosus mold and the second solution in the nucleus pulposus mold;
 f) Releasing the first solution from the annulus fibrosus mold and the second solution from the nucleus pulposus mold;
 g) Placing the released first and second solution into the intervertebral disc mold and ensuring the first solution of the annulus fibrous is surrounding and touching the second solution of the nucleus pulposus;
 h) Freezing the first and second solution in the intervertebral disc mold;
 i) Thawing the first and second solution in the intervertebral disc mold; and
 j) Releasing the first and second solution from the intervertebral disc mold;
 wherein the first solution comprises a polyvinyl alcohol (PVA) solution with 7-10% PVA and deionized water and fibrous material.

22. The method of claim 21, wherein the second solution comprises a PVA solution with 7-10% PVA and deionized water.

* * * * *